US012591954B2

(12) United States Patent
Chang et al.

(10) Patent No.: US 12,591,954 B2
(45) Date of Patent: Mar. 31, 2026

(54) DEPTH INFORMATION DETECTOR, TIME-OF-FLIGHT CAMERA, AND DEPTH IMAGE ACQUISITION METHOD

(71) Applicant: Rayprus Technology (Foshan) Co., Ltd., Foshan (CN)

(72) Inventors: Jui-Hsuan Chang, New Taipei (TW); Cheng-Yuan Shih, New Taipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 93 days.

(21) Appl. No.: 18/616,434

(22) Filed: Mar. 26, 2024

(65) Prior Publication Data

US 2024/0412329 A1      Dec. 12, 2024

(30) Foreign Application Priority Data

Jun. 8, 2023    (CN) .......................... 202310681724.6

(51) Int. Cl.

| | |
|---|---|
| *G06T 5/50* | (2006.01) |
| *G01S 7/499* | (2006.01) |
| *G01S 17/00* | (2020.01) |
| *G01S 17/894* | (2020.01) |
| *G06T 5/20* | (2006.01) |

(Continued)

(52) U.S. Cl.
CPC ................ *G06T 5/50* (2013.01); *G01S 7/499* (2013.01); *G01S 17/003* (2013.01); *G01S 17/894* (2020.01); *G06T 5/20* (2013.01); *G06T 7/0002* (2013.01); *G06T 7/521* (2017.01); *G06T 7/55* (2017.01); *G06T 2207/10028* (2013.01);

(Continued)

(58) Field of Classification Search
CPC . G06T 7/11; G06T 17/00; G06T 2207/10028; G06T 7/00; G06T 7/521; G06T 15/50; G06T 19/006; G06T 2207/10004; G06T 2207/10024; G06T 2207/30201; G06T 2200/08; G06T 2207/10016; G06T 2207/20081; G06T 2207/20084; G06T 7/50
USPC ......................................... 348/148
See application file for complete search history.

(56) References Cited

U.S. PATENT DOCUMENTS

2021/0173086 A1      6/2021  Park et al.
2021/0372779 A1 *  12/2021  DeWeert ................. G01S 7/499

FOREIGN PATENT DOCUMENTS

CN          216561000 U      5/2022
WO      WO-2018061508 A1 *  4/2018   ............. H04N 23/12

* cited by examiner

*Primary Examiner* — Masum Billah
(74) *Attorney, Agent, or Firm* — ScienBiziP, P.C.

(57) ABSTRACT

A depth information detector includes a light receiving module and a processor. The light receiving module includes a first receiver and a second receiver set at intervals. The first receiver and the second receiver receive a reflected light reflected by an object to be detected at different positions respectively. The processor electrically connects to the light receiving module. The processor is configured for synthesizing the reflected light received by the first receiver and the second receiver into a depth image. The light receiving module also includes a first polarizer and a second polarizer, the first polarizer is on one side of the first receiver, the second polarizer is on one side of the second receiver, a polarization direction of the first polarizer and a polarization direction of the second polarizer are orthogonal to each other. A time-of-flight camera and a depth image acquisition method are further disclosed.

20 Claims, 5 Drawing Sheets

100

(51) Int. Cl.
  *G06T 7/00* (2017.01)
  *G06T 7/521* (2017.01)
  *G06T 7/55* (2017.01)
(52) U.S. Cl.
  CPC ............... *G06T 2207/20192* (2013.01); *G06T 2207/20212* (2013.01)

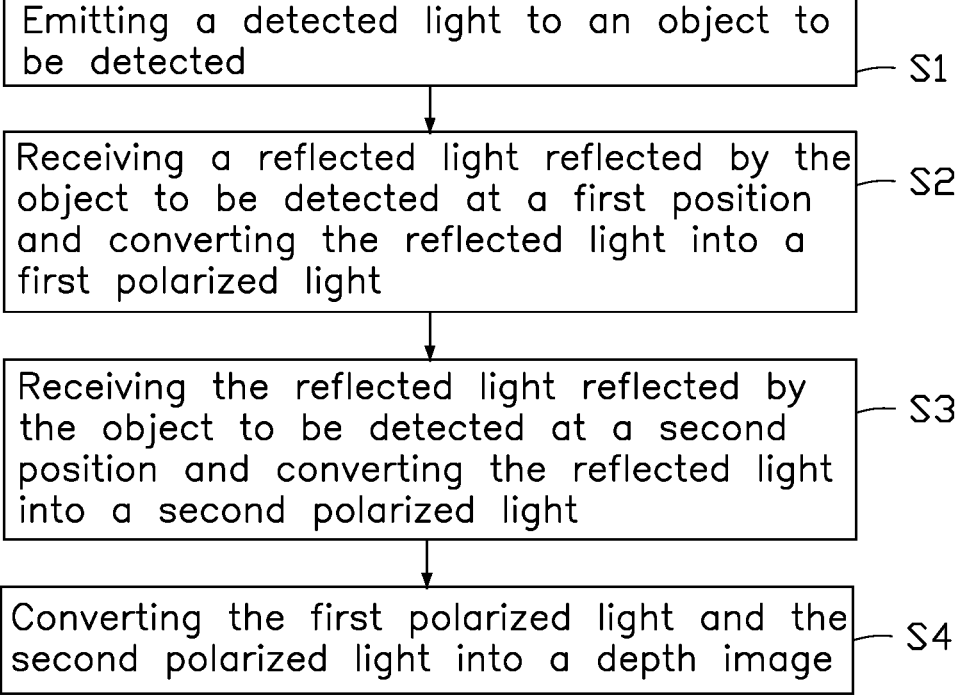

Emitting a detected light to an object to be detected — S1

Receiving a reflected light reflected by the object to be detected at a first position and converting the reflected light into a first polarized light — S2

Receiving the reflected light reflected by the object to be detected at a second position and converting the reflected light into a second polarized light — S3

Converting the first polarized light and the second polarized light into a depth image — S4

FIG. 4

DEPTH INFORMATION DETECTOR, TIME-OF-FLIGHT CAMERA, AND DEPTH IMAGE ACQUISITION METHOD

FIELD

The subject matter herein relates to depth information detector, time-of-flight camera, and depth image acquisition method.

BACKGROUND

Existing time-of-flight cameras usually emit detection light of a fixed frequency to an object to be detected, and sense the time required for the detection light to be reflected by the object back to the cameras to calculate the depth information. However, the time-of-flight camera may also receive stray light reflected by ambient light shining on the object to be detected, resulting in errors in the depth image obtained.

Therefore, there is room for improvement within the art.

BRIEF DESCRIPTION OF THE DRAWINGS

Implementations of the present disclosure will now be described, by way of embodiment, with reference to the attached figures, wherein:

FIG. 4 is a flowchart illustrating an embodiment of a depth image acquisition method according to the present disclosure.

DETAILED DESCRIPTION

Figure 1:
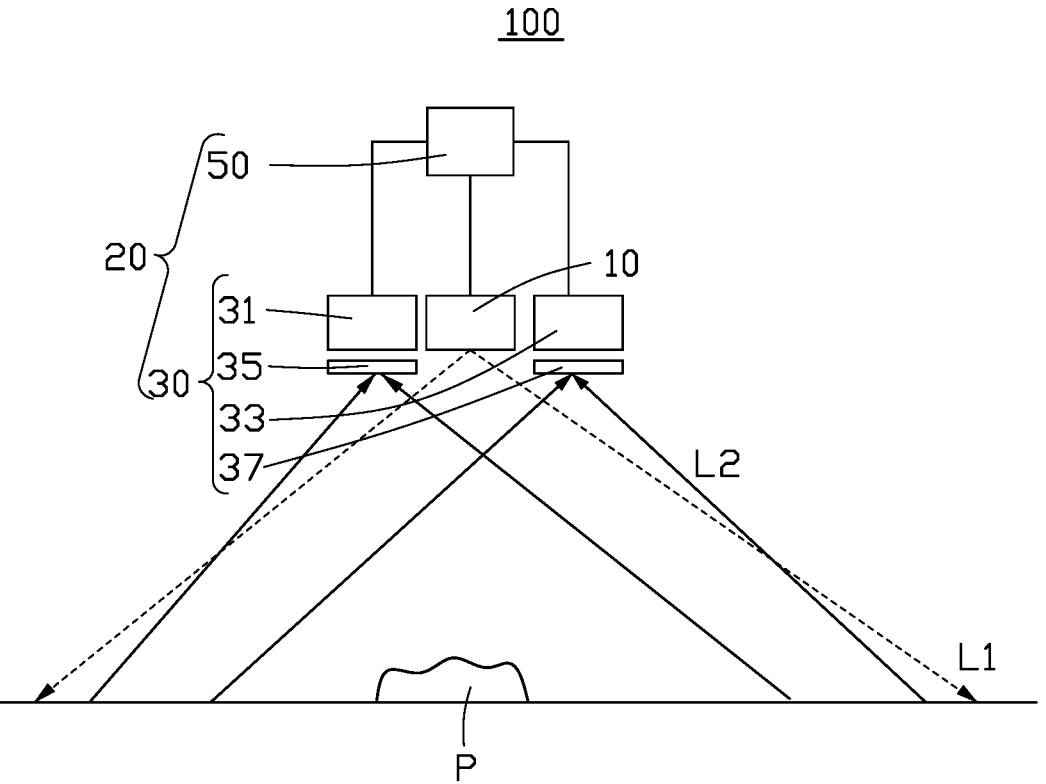
FIG. 1 is a schematic view of an embodiment of a time-of-flight camera according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

"Optional" or "optionally" means that the subsequently described circumstance may or may not occur, so that the description includes instances where the circumstance occurs and instances where it does not.

"Above" means one layer is located on top of another layer. In one example, it means one layer is situated directly on top of another layer. In another example, it means one layer is situated over the second layer with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached or coupled to the other feature or element or intervening features or elements may be present.

FIG. 1 illustrates a time-of-flight camera 100 according to a first embodiment of the present disclosure. The time-of-flight camera 100 includes a light emitting module 10 and a depth information detector 20, the depth information detector 20 includes a light receiving module 30 and a processor 50. The light emitting module 10 is used to emit a detection light L1, and a reflected light L2 may be produced when the detection light L1 irradiates an object P detected and is reflected by the object P. The light receiving module 30 is used to receive the reflected light L2. In particular, the light receiving module 30 includes a first receiver 31 and a second receiver 33, and the first receiver 31 and the second receiver 33 are used to receive the reflected light L2 at different positions, respectively. The processor 50 is electrically connected to the light receiving module 30 for synthesizing the reflected light L2 received by the first receiver 31 and the second receiver 33 into a depth image with depth information.

In this embodiment, the light receiving module 30 also includes a first polarizer 35 and a second polarizer 37, the first polarizer 35 is arranged on a side of the first receiver 31 for receiving the reflected light L2, that is, the first polarizer 35 is arranged on the light path between the object P detected and the first receiver 31. The second polarizer 37 is arranged on a side of the second receiver 33 for receiving the reflected light L2, that is, the second polarizer 37 is arranged on the light path between the object P detected and the second receiver 33. Polarization directions of the first polarizer 35 and the second polarizer 37 are orthogonal to each other.

In this embodiment, the light emitting module 10 is a vertical-cavity surface-emitting laser. The detection light L1 is an unpolarized light with a specific frequency, and the detection light L1 is emitted from the light emitting module 10 and propagates to an irradiation region to irradiate on the object P detected.

In this embodiment, the first receiver 31 and the second receiver 33 can be photoelectric sensors of the same model for converting an optical signal to an electrical signal. The first receiver 31 and the second receiver 33 are spaced apart from each other to receive the reflected light L2 at different positions to obtain stereo depth information of the object P detected, respectively. In addition, since a predetermined distance exists between the first receiver 31 and the second receiver 33, the reflected light L2 reflected from the object P detected has different optical paths to the first receiver 31 and the second receiver 33. By obtaining distance between the object P detected and the first receiver 31 and distance between the object P detected and the second receiver 33, and according to the distance between the first receiver 31 and the second receiver 33, a three-dimensional spatial information of the object P detected relative to the time-of-flight camera 100 can be obtained. The three-dimensional spatial information includes spatial coordinates of different positions on the object P detected.

In this embodiment, the first receiver 31 and the second receiver 33 are arranged at two sides of the light emitting module 10, respectively, and are spaced from the light emitting module 10 with the same distance. Specifically, after the detection light L1 is emitted from the light emitting module 10, the detection light L1 illuminates the object P detected to generate the reflected light L2, and the reflected light L2 is received by the first receiver 31 and the second receiver 33 respectively. By arranging the first receiver 31 and the second receiver 33 at the same distance on both sides of the light emitting module 10, a light intensity of the reflected light L2 received by the first receiver 31 and a light intensity of the reflected light L2 received by the second receiver 33 are approximately equal to facilitate subsequent comparison analysis. In other embodiments, the first receiver 31 and the second receiver 33 may also be arranged simultaneously on the same side of the light emitting module 10 or arranged on other locations.

Figure 2:
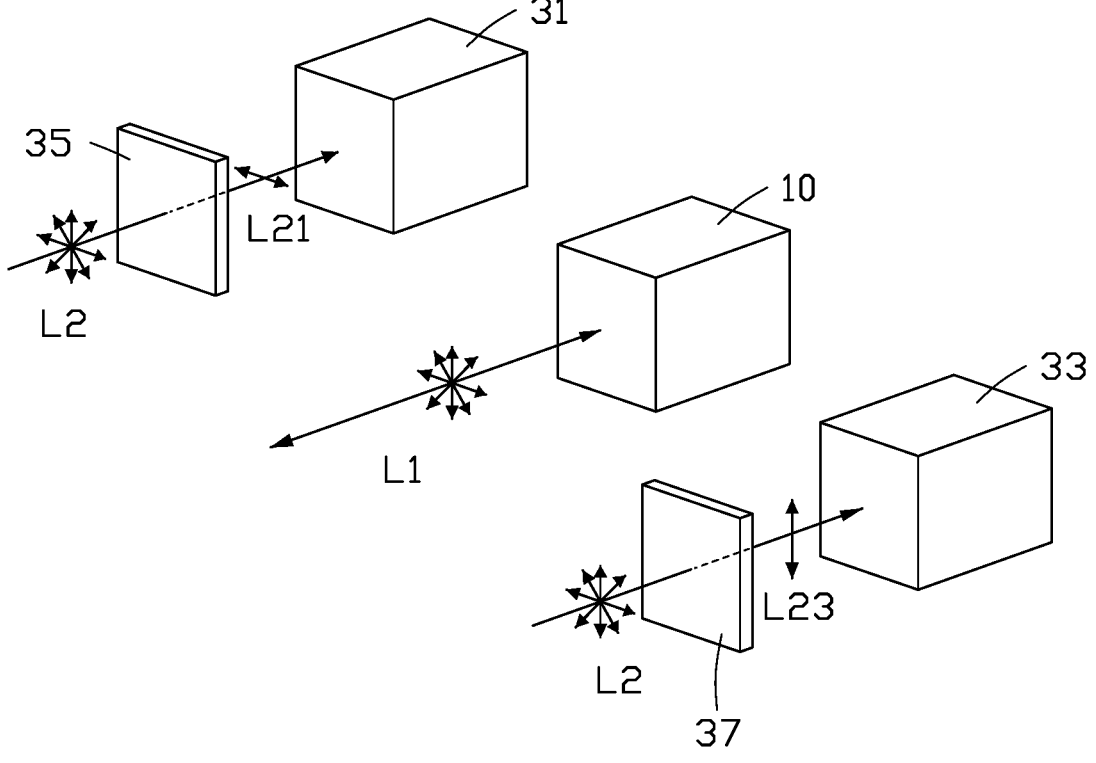
FIG. 2 is a schematic view of an optical path of a time-of-flight camera according to the present disclosure.

FIG. 2 illustrates an optical path of the light emitting module 10 and the light receiving module 30. The first polarizer 35 is arranged on a side of the first receiver 31 for receiving the reflected light L2, and the first polarizer 35 is used to convert the reflected light L2 received into a first polarized light L21. The second polarizer 37 is arranged on a side of the second receive 33 for receiving the reflected light L2, and the second polarizer 37 is used to convert the reflected light L2 received into a second polarized light L23. Specifically, both the first polarizer 35 and the second polarizer 37 are used to filter the reflected light L2 so that only light with a predetermined polarization direction is allowed to pass through the first polarizer 35 and the second polarizer 37 respectively. The polarization directions of the first polarizer 35 and the second polarizer 37 are orthogonal to each other, that is, the polarization direction of the first polarized light L21 and the polarization direction of the second polarized light L23 are orthogonal to each other, so that the first polarized light L21 and the second polarized light L23 respectively retain part of the information of the reflected light L2.

In this embodiment, the processor 50 can be a central processor or an integrated circuit comprising a plurality of chips. The processor 50 electrically connects to the light emitting module 10 for controlling the detection light L1 emitted from the light emitting module 10. The processor 50 also electrically connects to the light receiving module 30 for analyzing and calculating the reflected light L2 received by the light receiving module 30.

Figure 3:
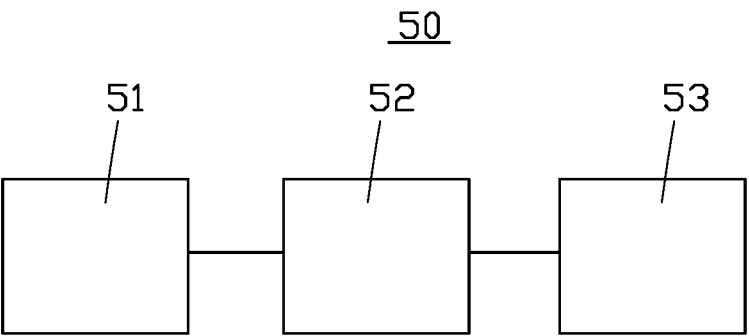
FIG. 3 is a schematic view of an embodiment of a processor according to the present disclosure.

FIG. 3 illustrates the module structure of the processor 50. In this embodiment, the processor 50 includes a conversion module 51 for converting an optical signal of reflected light L2 into an image signal including brightness information and depth information. The conversion module 51 is also used for converting the reflected light L2 received by the first receiver 31 into a first image and the reflected light L2 received by the second receiver 33 into a second image. Specifically, after the first receiver 31 receives the reflected light L2, the optical signal of the reflected light L2 is converted into an electrical signal and transmitted to the processor 50, the processor 50 converts the electrical signal transmitted by the first receiver 31 into the first image. The second receiver 33 also converts the optical signal of the reflected light L2 into an electrical signal and then transmits it to the processor 50 to obtain the second image. Each of the electrical signals includes brightness information and depth information of the reflected light L2, the brightness information records the brightness of different parts of the object P detected, and the depth information records the distance between every part of the object P detected and the time-of-flight camera 100. Therefore, both the first image and the second image include brightness information and depth information. In addition, since the first image and the second image record the reflected light L2 at a certain moment, the first image and the second image also include phase information.

In this embodiment, both the first image and the second image are depth images including depth information. For the first image, after receiving the reflected light L2 at the first receiver 33, the processor 50 converts the optical signal into an electrical signal, in which the optical signal records the phase information of the reflected light L2, and the processor 50 can convert the reflected light L2 into multiple phase images (for example, four). The flight distance of reflected light L2 can be calculated by the phase difference between multiple phase images, and then the first image recording depth information can be obtained. The process above can also be applied to obtain the second image recording depth information.

In this embodiment, the processor 50 also includes a comparison decomposition module 52, which is used to compare the brightness information of the first image and the second image to screen out the depth information corresponding to the stray light of the external environment in the first image and the second image. Specifically, because the reflected light L2 also includes stray light from the external environment, the stray light is recorded in the first image and the second image, affecting the recording effect of the time-of-flight camera 100. Since the first image records the light signal intensity of reflected light L2 in the first polarization direction, and the second image records the light signal intensity of reflected light L2 in the second polarization direction, the first polarization direction and the second polarization direction are perpendicular, so the first image and the second image record the reflected light L2 in different polarization states respectively. By comparing the brightness in the first image and the second image, the areas affected by stray light in the first image and the second image can be screened out, so that the depth information of the affected area can be eliminated or reduced.

In this embodiment, the processor 50 is also used to synthesize the first image and the second image without the stray light into a depth image. Specifically, each pixel of the first image and the second image includes the depth information and the credibility of the depth information. When the processor 50 converts the depth information, it will calculate the credibility of the depth information corresponding to each pixel according to a certain algorithm. The credibility represents the reliability of the depth information. The higher the reliability, the higher the accuracy of depth information corresponding to pixels. When the brightness of a pixel on the first image and the second image is different, it can be regarded as the area affected by stray light, and its confidence is reduced or eliminated. If the area is not affected by stray light, the depth information with the highest confidence or according to a certain proportion of synthesis is desirable.

For example, a certain pixel is affected by stray light, so the credibility of the pixel depth signal is low, in the process of synthesis, the depth information of the corresponding pixel can be directly deleted or reducing the credibility of the pixel depth signal.

In this embodiment, the conversion module 51 is also used to convert the signal of the reflected light L2 into a phase image and to synthesize the phase image of the first receiver 31 and the second receiver 33 into a compensated image. The processor 50 also includes a compensation module 53 for compensating the contours of the object P detected in the depth image based on the compensation image.

Specifically, the inventor of this disclosure notes that, when recording depth information, the reflected light L2 received by the first receiver 31 and the second receiver 33 from the object P detected generally reflect less light at the edge of the projection of the object P to the time-of-flight camera 100 due to an angle of the reflected light L2. As a result, the outline of object P detected in the recorded picture is not clear. The reflected light L2 received by the first receiver 31 and the second receiver 33 is converted into the phase image, and the phase image is processed and the compensated image is obtained by a calculation method of stereo vision.

Because the stereo vision can record the depth information of contour position better, the depth image synthesized by the first image and the second image can be compensated according to the compensated image to compensate the contour of the object P detected in the depth image.

The light emitting module 10 emits the detection light L1, and the light receiving part 30 is configured to record the reflected light L2 generated after the detection light L1 is irradiated to the object P detected, as such, the flight time of the light can be obtained, and the depth information of the object P detected can be recorded. The first receiver 31 and the second receiver 33 receive the reflected light at different positions, the depth image including depth information of the object P detected can be obtained. The first polarizer 35 and the second polarizer 37 with mutually orthogonal polarization directions on the side of the first receiver 31 and the second receiver 33, the stray light generated from the external environment in the reflected light L2 can be analyzed by comparison, thus removing the stray light and improving the accuracy of the depth image.

Referring to FIG. 4, a flowchart of an example method for acquiring a depth image is shown. The example method is provided by way of example, as there are a variety of ways to carry out the method. The method described below can be carried out using the configurations illustrated in FIGS. 1 through 3, for example, and various elements of these figures are referenced in explaining example method. Each block shown in FIG. 4 represents one or more processes, methods, or subroutines, carried out in the exemplary method. Additionally, the illustrated order of blocks is by example only and the order of the blocks can change according to the present disclosure. The exemplary method can begin at block S1.

At block S1, the detection light L1 is emitted to the object P detected.

At block S2, the reflected light L2 reflected from the object P is received at a first position, and the reflected light L2 is converted to the first polarized light L21.

At block S3, the reflected light L2 reflected from the object P is received at a second position, and the reflected light L2 is converted to the second polarized light L23.

At block S4, the first polarized light L21 and the second polarized light L23 are converted to the depth image.

In this embodiment, the depth image acquisition method above can be realized by the time-of-flight camera 100. The first position corresponds to the position of the first receiver 31, and the second position corresponds to the position of the second receiver 33. In other embodiments, the depth image acquisition method described above may also be implemented by other image acquisition devices.

In this embodiment, the detection light L1 in block S1 produces reflected light L2 after encountering the object P detected, and the polarization direction of the first polarized light L21 is orthogonal to the polarization direction of the second polarized light L23. The block S4 also includes identifying and filtering out the stray light in the first and second polarized light.

Figure 5:
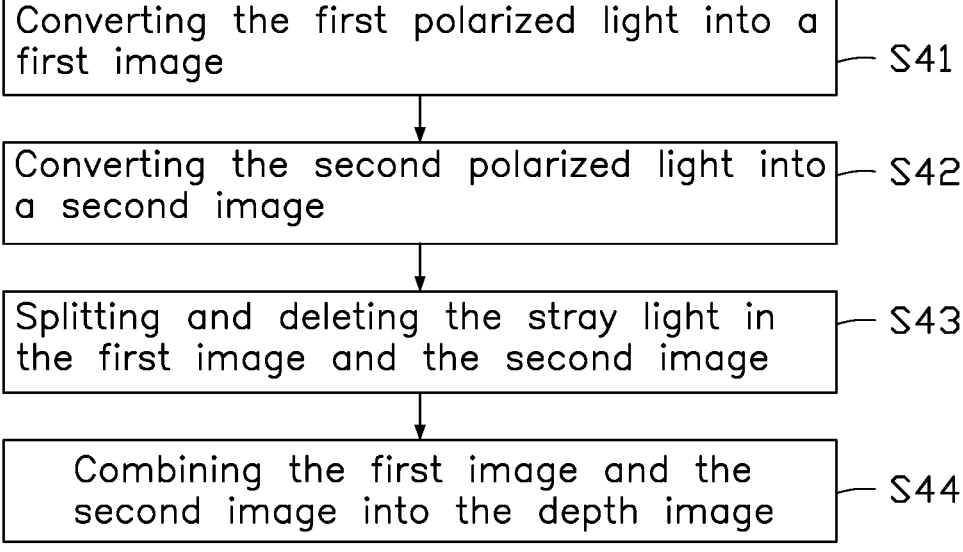
FIG. 5 is a flowchart of Block S4 in the method of FIG. 4.

FIG. 5 illustrates a flowchart of the further method of the block S4, which can begin at block S41.

At block S41, the first polarized light L21 is converted to the first image.

At block S42, the second polarized light L23 is converted to the second image.

At block S43, the stray light in the first image and the second image are split and deleted.

At block S44, the first image and the second image are combined into the depth image.

In this embodiment, block S41 further includes generating multiple phase images recording phase information and generating the first image based on the phase images. Specifically, the processor 50 is used to convert the optical signal of the first polarized light L21 into multiple phase images recording phase information, and by comparing the phase difference between the multiple phase images, the processor 50 can calculate the full flight distance of the detected light L1 and the reflected light L2. The distance between the object P detected and the first receiver 31 is calculated, and the first image recording depth information is generated.

In this embodiment, block S43 further includes comparing and analyzing the brightness information of the first image and the second image to screen out the stray light in the first image and the second image. Specifically, the detection light L1 is unpolarized light, and the light signal intensity of the detection light L1 is the same in different polarization directions. When comparing the first image and the second image, the part of the first image and the second image affected by stray light can be confirmed by comparing the brightness.

In this embodiment, the block S44 also includes reducing or eliminating the depth information corresponding to stray light in the first image and the second image, and combining the depth information of the object P detected in the first image with the depth information of the corresponding position on the second image. Specifically, according to the comparison results at the block S43, the confidence value can be set for the first image and the second image, the higher the confidence value is, the less the impact of stray light. When synthesizing the first image and the second image, the confidence value of each pixel in the first image and the second image can be sequentially compared, and the higher confidence value in the first image or the second image is chosen as the pixel corresponding to the depth image. Alternatively, the confidence value of the first image and the second image is synthesized according to the proportion as the pixel corresponding to the depth image, and finally the complete depth image is obtained.

In this embodiment, the depth image acquisition method also includes converting the reflected light into a phase image at the first position and the second position respectively, synthesizing a compensated image based on the phase image, and compensating the depth image according to the compensated image. Specifically, since the first receiver 31 and the second receiver 33 are located at different positions, stereo vision images different from the time-of-flight images can be formed by means of stereo vision. Since the depth information of the first image and the second image obtained by means of time-of-flight is not clear at the contour position of the object P detected, the image obtained through stereo vision can be used as compensation image to compensate the unclear position in the depth image.

By recording the depth information of the object P at different positions, the stereo depth image of the object P can be obtained. By polarizing the reflected light at different positions with different polarization directions, the depth image with different polarization states can be obtained, so that the stray light in the reflected light can be filtered out and the accuracy of the depth image can be improved.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A depth information detector comprising:
   a light receiving module comprising a first receiver and a second receiver spaced apart from each other, each of the first receiver and the second receiver being configured for receiving a reflected light reflected by an object to be detected at different positions respectively; and
   a processor electrically connected to the light receiving module, the processor being configured for:
   synthesizing the reflected light received by the first receiver and the second receiver into a depth image comprising depth information,
   wherein the light receiving module further comprises a first polarizer and a second polarizer, the first polarizer is on one side of the first receiver receiving the reflected light, the second polarizer is on one side of the second receiver receiving the reflected light, the first polarizer and the second polarizer have polarization directions orthogonal to each other;
   wherein synthesizing the reflected light received by the first receiver and the second receiver into a depth image comprises:
   converting the reflected light received by the first receiver into a first polarized light;
   converting the reflected light received by the second receiver into a second polarized light;
   converting the first polarized light into a first image;
   converting the second polarized light into a second image;
   splitting and deleting stray light in each of the first image and the second image; and combining the first image and the second image into the depth image.

2. The depth information detector of claim 1, wherein the processor comprises a conversion module for converting a signal of the reflected light into an image signal, the image signal comprises brightness information and depth information, the conversion module is further configured to convert the reflected light received by the first receiver into the first image, and convert the reflected light received by the second receiver into the second image.

3. The depth information detector of claim 2, wherein the processor further comprises a comparison decomposition module configured for comparing brightness information of the first image and brightness information of the second image, and filtering out depth information corresponding to the stray light in the first image and the second image according to a comparison result.

4. The depth information detector of claim 2, wherein the conversion module is further configured for converting optical signals of the reflected light received respectively by the first receiver and the second receiver into a phase image, and synthesizing the phase image into a compensated image; the processor further comprises a compensation module for compensating an outline of an object detected in the depth image according to the compensation image.

5. A time-of-flight camera comprising:
   a light emitting module configured for emitting detection light to an object to be detected;
   a light receiving module comprising a first receiver and a second receiver spaced apart from each other, each of the first receiver and the second receiver being configured for receiving a reflected light reflected by an object to be detected at different positions respectively; and
   a processor electrically connected to the light receiving module, the processor being configured for:
   synthesizing the reflected light received by the first receiver and the second receiver into a depth image comprising depth information,
   wherein the light receiving module further comprises a first polarizer and a second polarizer, the first polarizer is on one side of the first receiver receiving the reflected light, the second polarizer is on one side of the second receiver receiving the reflected light, the first polarizer and the second polarizer have polarization directions orthogonal to each other;
   wherein synthesizing the reflected light received by the first receiver and the second receiver into a depth image comprises:
   converting the reflected light received by the first receiver into a first polarized light;
   converting the reflected light received by the second receiver into a second polarized light;
   converting the first polarized light into a first image;
   converting the second polarized light into a second image;
   splitting and deleting stray light in each of the first image and the second image; and
   combining the first image and the second image into the depth image.

6. The time-of-flight camera of claim 5, wherein the first receiver and the second receiver are respectively arranged on both sides of the light emitting module.

7. The time-of-flight camera of claim 6, wherein the first receiver and the second receiver are arranged at the same distance on both sides of the light emitting module.

8. The time-of-flight camera of claim 5, wherein the detection light is unpolarized light.

9. The time-of-flight camera of claim 5, wherein the processor comprises a conversion module for converting a signal of the reflected light into an image signal, the image signal comprises brightness information and depth information, the conversion module is further configured to convert the reflected light received by the first receiver into the first image, and convert the reflected light received by the second receiver into the second image.

10. The time-of-flight camera of claim 9, wherein the processor further comprises a comparison decomposition module configured for comparing brightness information of the first image and brightness information of the second image, and filtering out depth information corresponding to the stray light in the first image and the second image according to a comparison result.

11. The time-of-flight camera of claim 10, wherein the processor is further configured for setting a confidence value for each pixel of the first image and the second image such that a pixel with a high confidence value is less affected by the stray light, the processor is further configured for sequentially comparing with the confidence value of each pixel, and the pixel with higher confidence value in the first image and the second image is used as the pixel at corresponding coordinates to synthesize the depth image.

12. The time-of-flight camera of claim 10, wherein the processor is further configured for setting a confidence value for each pixel of the first image and the second image, and a pixel with a high confidence value is less affected by the stray light, the processor is also configured for sequentially comparing with confidence value of each pixel, and the depth information of the first image and the second image is synthesized as a pixel corresponding to the depth image according to the proportion of confidence value.

13. The time-of-flight camera of claim 10, wherein the conversion module is further configured for converting optical signals of the reflected light received respectively by the first receiver and the second receiver into a phase image, and synthesizing the phase image into a compensated image; the processor further comprises a compensation module for compensating an outline of an object detected in the depth image according to the compensation image.

14. A depth image acquisition method comprising:
emitting a detection light to an object to be detected;
receiving a reflected light reflected by the object to be detected at a first position and converting the reflected light into a first polarized light;
receiving the reflected light reflected by the object to be detected at a second position and converting the reflected light into a second polarized light; and
converting the first polarized light and the second polarized light into a depth image,
wherein a polarization direction of the first polarized light is orthogonal converted with respect to a polarization direction of the second polarized light, and
wherein converting the first polarized light and the second polarized light into a depth image comprises:
identifying and filtering stray light in each of the first polarized light and the second polarized light;
converting the first polarized light into a first image;
converting the second polarized light into a second image;

splitting and deleting the stray light in each of the first image and the second image; and
combining the first image and the second image into the depth image.

15. The depth image acquisition method of claim 14, wherein
the first image
and the second image each comprises phase information, brightness information, and depth information.

16. The depth image acquisition method of claim 15, wherein splitting and deleting the stray light in each of the first image and the second image comprises:
comparing the brightness information of the first image with the brightness information of the second image, and screening out depth information corresponding to the stray light in each of the first image and the second image.

17. The depth image acquisition method of claim 16, wherein combining the first image and the second image into the depth image comprises:
reducing or eliminating the depth information corresponding to the stray light in each of the first image and the second image, and combining the depth information of the object in the first image and the depth information of the object in the second image into the depth image.

18. The depth image acquisition method of claim 17, wherein combining the first image and the second image into the depth image further comprises:
setting a confidence value for each pixel of the first image and the second image such that a pixel with a high confidence value is less affected by the stray light;
sequentially comparing with the confidence value of each pixel; and
setting the pixel with higher confidence value in the first image and the second image as the pixel corresponding to the depth image.

19. The depth image acquisition method of claim 17, wherein combining the first image and the second image into the depth image further comprises:
setting confidence value for each pixel of the first image and the second image such that a pixel with a high confidence value is less affected by the stray light;
sequentially comparing with confidence value of each pixel; and
synthesizing the depth information of the first image and the second image as a pixel corresponding to the depth image according to the proportion of confidence value.

20. The depth image acquisition method of claim 14, after converting the first polarized light and the second polarized light into a depth image, the depth image acquisition method further comprising:
converting the reflected light into phase images at the first position and the second position respectively;
synthesizing a compensated image according to the phase images; and
compensating the depth image according to the compensated image.

* * * * *